United States Patent Office 3,413,265

Patented Nov. 26, 1968

3,413,265

HYDROLYTIC SCISSION OF POLYMERS CONTAINING GEM DITHIOETHER LINKAGES

Eugene R. Bertozzi, Yardley, Pa., assignor to Thiokol Chemical Corporation, Bristol, Pa., a corporation of Delaware No Drawing. Filed Aug. 31, 1965, Ser. No. 484,105
12 Claims. (Cl. 260—46.5)

ABSTRACT OF THE DISCLOSURE

A process is provided for preparing polymercaptan polymers by reacting polymers containing gem dithioether linkages with water in the presence of a strong nonoxidizing acid.

This invention relates to liquid or easily meltable polymercaptan containing polymeric products and to a process therefor. More particularly, this invention relates to polymercaptan containing polymers that are normally liquid at common room temperatures or are easily meltable solids and to a hydrolytic process for their formation.

It is an object of this invention to provide a novel method for preparing liquid or easily meltable polymeric materials which contain a plurality of mercaptan groups.

Another object is to provide novel curable liquid or easily meltable polymercaptan containing polymeric materials which subsequently may be oxidatively condensed or cured to form solid elastomers.

Yet other desirable objects will become evident from or are inherent in the following explanations, descriptions and examples.

Polymercaptan containing liquid or easily meltable polymers of this invention may be written

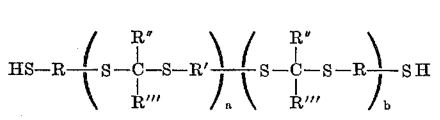

wherein R, R′, R″ and R‴ may be the same or different and are groupings that may be aliphatic, aromatic, alkaryl or siloxyl or mixtures thereof in nature the chains of which may occasionally be interrupted by chalcogen atoms, that is of oxygen and/or sulfur, by olefinic groups, viz —CH═C—, or by urethane or polysulfide linkages; *a* is an integer from and including 0 to about 100 and *b* is an integer from 0 and including to about 100. R″ and R‴ also may be hydrogen. By "easily meltable" is meant, for the purposes of this invention, a solid that melts to form a chemically stable liquid at or below 100° C. The polymeric products of this invention have molecular weights in the range of about 400 to 25,000.

The liquid or easily meltable polymers of this invention are formed by the hydrolytic scission of a carbonyl compound from solid and/or liquid polymer reactants of from 5,000 to over 1,000,000 molecular weight which initially contain a plurality of gem dithioether groups. The gem dithioether group has the structure

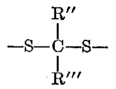

whereing two thioether sulfur atoms are both bonded to the same carbon atom. This process, according to the invention, proceeds in the presence of water as a coreactant and a catalytically effective quantity of a strong nonoxidizing acid, i.e. nonoxidizing acid with a $pK_a$ not greater than about 2.5. It may be pictured as in Equation 1 for a reactant polymer having two gem dithioether linkages.

(1)

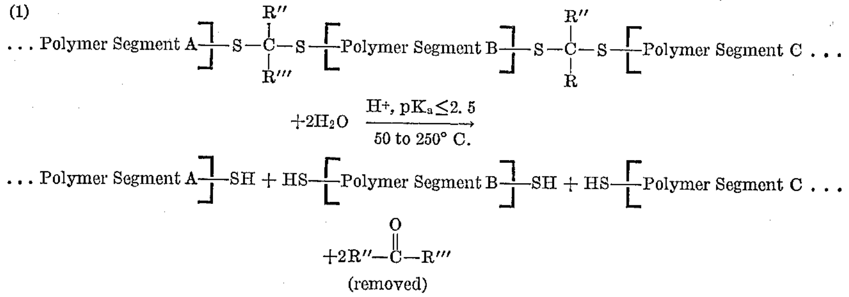

Thus, in order to obtain the instant polymercaptan containing polymers according to the invention, a polymer reactant must be used that contains a plurality, i.e. at least two, of gem dithioether linkages.

The extent to which the polymer reactant may be split into mercaptan-terminated molecules may generally be controlled, according to the invention, by controlling the amount of water reactant employed. In general, since each gem dithioether linkage requires a molecule of water to effect its splitting, therefore, under the conditions of the instant process complete scission of all gem dithioether linkages is possible in the presence of water molecules in amounts equal to or greater than the number of gem dithioether linkages present in the polymer reactant. Alternately, limited scission of the polymer reactant may be effected by using numbers of water molecules in amounts less than the number of gem dithioether groups originally present in the polymer reactant, i.e. water present in less than stoichiometric quantities. Hydrolytic splitting, in general, is effected in random fashion among the various gem dithioether linkages of the polymer reactant, thus when a less than stoichiometric amount of water is used, the specific gem dithioether groups undergoing splitting may be any of those present anywhere in the polymer molecular backbone. The mercaptan-terminated polymer molecules so produced, therefore, in gross view show a random distribution of molecular weights.

The average molecular weight of the mercaptan-terminated polymer molecules obtained may easily be prescribed according to the invention through a knowledge of the average number of gem dithioether linkages present per unit weight of the polymer, and through prescribing a quantity of water that is a specific fractional amount of the stoichiometric quantity of water needed to effect complete splitting. Thus, if there are an average of 10 gem dithioether linkages or 10 equivalent weights of gem dithioether linkages per arbitrarily chosen 10,000 molecular unit weight of a linear polymer reactant, then reaction of 10 molecules of water or 10 equivalent weights of water per unit weight of the polymer reactant would, on the average, effect complete splitting and provide on the average dimercaptan-terminated polymer molecules with an average molecular weight of about 1,000. Reaction with 5 equivalents of water would provide on the average 5 mercaptan-terminated polymer molecules per 10,000 molecular unit weight of linear polymer reactant each with an average molecular weight of about 2,000, wherein each such dimercaptan molecule product on the average would still contain one equivalent weight of intact gem dithioether linkages. Conveniently, according to the invention, these calculations may be expressed by the several Formulae 2, 3 and 4.

The average molecular weight of polymercaptan polymer product obtained by complete hydrolytic splitting, i.e. when a stoichiometric amount of water is used which is to say when 1 mol of water per equivalent of gem dithioether linkage of the polymeric reactant is used, is provided by $$(2)\qquad \frac{W-A(\mathrm{CR''R'''})}{A}=M$$

wherein A is the number of equivalents of gem dithioether linkages initially present per specific weight W, M is the average molecular weight of the polymercaptan polymer product, and (CR″R‴) is the molecular weight of the group R″—C—R‴ abstracted from the gem dithioether linkages,

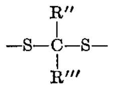

when they are split. If the exact structure of the polymer reactant is unknown, which is commonly the case, the average molecular weight M of the polymercaptan polymer product may be simply determined by experiment, according to the invention. The purpose, first, is to find the number of gem dithioether linkages per unit weight W of polymer reactant. This is done by the hydrolytic splitting of all such linkages with water to provide mercaptan groups. The net number of equivalents of mercaptan groups so produced is twice the number of equivalents of gem dithioether linkages initially present in the polymer reactant. Thus, a known weight of poly(gem dithioether) containing polymer reactant initially is analyzed for number of mercaptan equivalents present per unit weight W of polymer reactant. A known weight of the polymer reactant is hydrolytically split using the instant process by increasing increments of water reactant until, by analysis, a constant number of mercaptan equivalents per unit weight W of polymer reactant is obtained with such increased incremental additions of water reactant. Then, simply, one half the net number of mercaptan equivalents per unit weight W of the polymer reactant equals A, the average number of gem dithioether linkages initially present per unit weight W. From A and W one may then calculate M by use of Equation 2.

The average molecular weight of dimercaptan polymer product obtained when less than the stoichiometric amount of water is used in hydrolytic splitting is provided by $$(3)\qquad \frac{W-B(\mathrm{CR''R'''})}{B}=M$$

wherein W, CR″R‴ and M are as was heretofore defined, and B is the number of mols or equivalent weights of water used per unit weight W, wherein $B<A$. Again M may be experimentally determined in identical manner as was described above, substituting B for A and wherein B is equal to the number of gem dithioether linkages split per unit weight of poly(gem dithioether) containing polymer reactant, or one-half the net number of mercaptan groups found after, and produced by, hydrolytic splitting. The specific dimercaptan product obtained by splitting a specific less than stoichiometric amount of gem dithioether linkages will thus contain on the average G number of gem dithioether linkages, which is the difference between the number of linkages split on complete hydrolytic splitting and the number split in the less than stoichiometric hydrolytic splitting. This is shown in Equation 4.

$$(4)\qquad A-B=G$$

In Equations 2 and 3 the correction factors, viz. A(CR″R‴) and B(CR″R‴), take into account the average loss of one carbon atom and R″ and R‴ group per dimercaptan product molecule formed. Although dimercaptan polymer products are obtained from linear poly(gem dithioether) containing polymer reactants, this invention also contemplates formation of tri- and higher polymercaptan products when branched poly(gem dithioether) polymer reactants are employed wherein each of the branches contains at least one gem dithioether linkage. For example a completely cured and crosslinked poly(gem dithioether) containing rubber or plastic may be hydrolytically split to branched polymercaptans by the instant process.

Polymeric reactants which are useful herein contain a plurality of gem dithioether linkages. They may be formed by sundry methods, such as by the inverse process of that shown in Equation 1, i.e. the joining of polymercaptans with carbonyl compounds and the formation and concomitant removal of water as a byproduct. Another useful method is to form specific poly(gem dithioether) polymethylene thioethers by the reaction of formaldehyde with hydrogen sulfide. Yet another and a preferred method to form useful poly(gem dithioether) polymer reactants is to react mercaptoalcohols with carbonyl compounds in the presence of non-oxidizing strong acid, and subsequently to polyetherify the gem dithioether diols obtained as reaction products by continualy removing water produced as a byproduct in the presence of a strong nonoxidizing acid at an elevated temperature. In all of these methods it is possible to produce polymers of very high molecular weights such as crude rubbers or plastics say in the form of solid latex-like materials, or in the form of liquid polymers of lower molecular weights. In general, such polymeric substances formed by direct polymerization suffer from several disadvantages for use as, say, in situ moldable and curable polymers such as would be needed for sealant, potting and coating applications. The crude rubbers so prepared which are uncrosslinked solids, would often require admixture with curing agents and adjuvants on a rubber mill prior to cure, and then subsequent vulcanization under pressure and at high temperatures. This forbids their "as is" use in in situ applications. The liquid poly(gem dithioether) containing polymer reactants prepared by direct polymerization often would not necessarily be curable per se, i.e. have no or insufficient reactive curing sites or reactive groups capable of ungoing curing reactions; or further such liquids often would be of such high viscosity as to forbid facile use even if they did contain sufficient curing sites. A further disadvantage to the direct end use of the polymer reactants stems from the fact that one may not easily prescribe their molecular weight merely by direct polymerization. It is now found, however, that it is a much simpler matter to selectively and prescribably split the high molecular weight polymer reactants to products of any desired and prescribable molecular weight by the teachings of this invention. The present process, indeed, provides a simple means to invariably provide curable polymers of unlimited storability and of a closely controlled average molecular weight that may be prescribed beforehand.

The preferred curable dimercaptan polymeric products of this invention are those prepared by the hydrolytic splitting of a poly(gem dithioether) polymer reactant formed first by the condensation of mercaptoalcohols with carbonyl compounds, and then by subsequent polyetherification of the gem dithioether diol so produced; or, alternately, by reaction of the gem dithioether diol or its polyetherified product with a polyisocyanate which may be a simple compound or a urethane prepolymer to thus impart urethane properties when desired to the polymer backbone. Suitable polyisocyanates which may be used to provide such urethane linkages may be aliphatic or aromatic or alkaryl in nature. Typical of the useful simple polyisocyanates which may be used as is or to form prepolymers each of which may be reacted with gem dithioether containing substances to form the instant polymer reactants suitable for hydrolytic splitting are the aromatic diisocyanates, e.g. the isomers of toluene diisocyanate, m-phenylene diisocyanate, 4-chloro-1,3-phenylene diisocyanate, 4,4′-biphenylene diisocyanate, and 1,5-naphthalene diisocyanate; and the aliphatic diisocyanates, such as 1,4-tetramethylene diisocyanate, 1,10-decamethylene diisocyanate, 1,4-cyclohexylene diisocyanate, and 4,4′-methylene-bis(cyclohexyl isocyanate); and the alkaryl diisocyanates, e.g. 4.4′-methylene-bis(phenylene isocyanate). They are used to join hydroxyl containing polymers which contain one or more gem dithioether linkages and thus provide suitable poly(gem dithioether) containing polymer reactants for present use which contain urethane linkages. The polymer reactants so formed should, however, contain no reactive isocyanate; this may easily be done by any of the sundry methods known to the art. In general, such useful urethane prepolymers are organic polymeric substances having a plurality of isocyanate groups, and are of the type depicted by the formula $$Q\left(NCO\right)_{\geq 2}$$

The Q group is predominantly polymeric in nature. Prepolymers are usually formed from substantially linear polymers, i.e. with few if any branchings, that contain a plurality of active hydrogen atoms. The term "active hydrogen atom" refers to a hydrogen atom which displays activity according to the Zerewitinoff test as described by Kohler in J. Amer. Chem. Soc. 49, 3181 (1927). The polymeric portion may be polyester, polyether, polythioether, polyalkylene polysulfide and/or polysiloxane in nature. Suitable active hydrogen atom containing polymers useful to form the foregoing prepolymers include in their number such polyhydroxyl-containing polymers as polyhydroxy polyesters, and/or polyethers, and/or polythioethers, and/or polyalkylene polysulfides, and/or polysiloxanes. Suitable polyhydroxyl polyesters may be formed as the esterification products of polycarboxylic acids and polyols, using an excess of polyol. Suitable polyhydroxyl polyethers may be formed as the condensation products of polyols and polyepoxides with an excess of the former, or as the acid condensation products of polyols in a polyetherification reaction. Suitable polyhydroxyl polythioethers may be formed as the acid condensation products of such thiopolyols as thiodiglycol and/or another thioether diol. One may also use polyhydroxyl polyetherthioethers which may be formed as the condensation products of thioether diols and formaldehyde or a formaldehyde generating compound, or alternately by the acid condensation of a polyol ether and a polyol thioether, such as dihydroxy diethylene ether and thiodiglycol. Suitable polyhydroxyl polyalkylene polysulfide polymers may be prepared by any of the methods disclosed in U.S. Patents 2,527,375, 2,606,193, 2,676,165, and/or by the acid condensation polyetherification reaction of polyhydroxy alkylene polysulfides, such as the suitable polyhydroxy containing polysulfides disclosed in U.S. Patents 2,378,576, 2,484,369, 2,527,374, and 2,858,274, among others. Useful liquid polyhydroxyl polysiloxanes may be prepared by the conventional methods known in the art to prepare so called hydroxyl-end blocked polysiloxanes such as those liquids disclosed in U.S. Patents 2,843,555, 2,934,519, 3,019,204, 3,050,485, 3,050,491, 3,061,575, 3,070,566, 3,077,465, 3,109,826 and 3,110,689. Analogous active hydrogen group containing polymers to the foregoing polyhydroxyl polymer, which have as their active hydrogen-containing groups either mercapto, primary and/or secondary amino, or carboxyl groups may also readily be prepared by methods well known in the art, and in turn also may be employed to prepare suitable prepolymers for present use.

Typical of the poly(gem dithioether) polymers which may be used per se as a reactant herein, or may be conjoined with urethane prepolymers or simple polyisocyanates as described above to form reactants, are the hydroxyl-terminated polymers formed with alternating gem dithioether and ether linkages. A process for preparing these polymers is disclosed by E. R. Bertozzi et al. in the copending application entitled "Polymer Products and Process" Ser. No. 484,122, filed Aug. 31, 1965. To prepare these polymers one may proceed in a first step through the reaction of a mercaptoalcohol, HS—Q′—OH, with a carbonyl compound $$R''-\overset{\overset{O}{\|}}{C}-R'''$$

such as an aldehyde or a ketone. The Q′ group is an organic divalent intervening group that preferably may be non-reactive with isocyanate and is in general any organic group that is aliphatic, aromatic, alicyclic or alkaryl in nature and which indeed may contain pendant halogen, alkyl, nitro or other non-oxidizing chemical groups; the carbon chains thereof also may be interrupted by olefinic groups $$-\overset{|}{\underset{|}{C}}=\overset{|}{\underset{|}{C}}-$$

or by chalcogen, that is sulfur and/or oxygen, atoms or by urethane or urea groups. The R″ and R‴ groups of the carbonyl are similarly defined as is Q′, but are monovalent in nature and additionally may be hydrogen, as in formaldehyde. Further R″ and R‴ may be the same or different. According to this technique the reactants mercaptoalcohol and carbonyl, first are admixed in the presence of a strong nonoxidizing acid, which acts as a catalyst, and in the absence of water. An inert organic solvent is usually present as a process acid. At this point, mercaptan groups of the alcohol preferentially react with the carbonyl with the evolution of heat to form a dihydroxy gem dithioether, wherein the terminal hydroxyl are each separated from the central gem dithioether group by the intervening group Q′. Water is produced as a by-product. This reaction is continued until substantially all mercaptan groups have reacted with carbonyl, e.g. two equivalents of mercaptan per equivalent of carbonyl to provide each equivalent of gem dithioether and mol of water. It is desirable that the ratio of equivalents of mercaptan to carbonyl, $$-SH/\overset{|}{\underset{|}{C}}=O$$

not be less than 2/1, so to substantially avoid the formation of gem diether linkages, which deleteriously would form hydroxyl terminals rather than mercaptan terminals in the instant hydrolytic splitting process. Thus by prescribing an $$SH/\overset{|}{\underset{|}{C}}=O$$

ratio of 2/1 only the dihydroxy gem dithioether compound is formed. The formation of the dihydroxy gem dithioether may be conducted at effective temperatures of 15 to 150° C. in effective reaction intervals of about 0.5 to 60 minutes. One then may prepare suitable polymer reactants for this invention which contain sequentially alternate linkages of gem dithioether and ether groups by etherifiction of the dihydroxy gem dithioether compound are joined in chain-extension with ether linkages by forcible removal both of the water of reaction formed in the condensation of carbonyl and mercaptoalcohol and the water formed by etherification of the terminal hydroxyls of the dihydroxy gem dithioether at elevated temperatures and in the presence of catalytically effective quantities of a strong non-oxidizing acid.

Hydrolytic splitting of poly(gem dithioether) containing polymer reactants as exemplarily shown in Equation 1, according to the present invention, is carried out in the presence of catalytically effective quantities of a strong non-oxidizing acid, i.e., one with a $pK_a$ of 2.5 or less. Both inorganic and organic acids are usefully employed singly or in combination, and include in their number such inorganic acids as sulfuric, hydrochloric, phosphoric, phosphorous and pyrophosphoric acids and such organic acids as dichloroacetic, glycerophosphoric, maleic, oxalic, trichloroacetic and p-toluene sulfonic acids. Catalytically effective amounts may be as little as 0.005 equivalent to as much as five acid equivalents of acid per equivalent or mol of water reactant.

Hydrolytic splitting, according to the invention, is carried out at elevated temperatures, i.e. above common room temperatures, and preferably within the range of about 50 to 250° C. Advantageously it is carried out until, for any amount of water charged, the mercaptan content of the product has become substantially constant with reaction time. This may occur in from as little as 30 minutes to as many as 200 hours, depending upon the amount of catalyst present and the temperature of reaction employed. Conveniently the polymer reactant may be charged to the reaction vessel in bulk, and if solid in a particulate form. Alternately, the polymer reactant may be charged as a solution of a solid dispersion in an inert organic solvent, such as an aliphatic or aromatic hydrocarbon or oxyhydrocarbon. The water reactant is then charged either all at one time, in discrete incremental quantities or continuously during the course of the hydrolytic reaction. The pot mixture of reactants is elevated to reaction temperatures either prior to or subsequent to the charge of a catalytically effective quantity of a non-oxidizing strong acid. An exemplary temperature therefor is 90° C. The reaction mixture is usually agitated during the course of reaction to promote better contact between the reactants. At intervals throughout, small quantities of the pot mixture may be removed to determine mercaptan content. The carbonyl byproduct evolved may be cautiously removed without removing water reactant during the course of reaction, thus promoting further hydrolytic splitting and a complete utilization of the water reactant. This may also be done, depending upon the physical or chemical nature of the carbonyl byproduct by such diverse means as complex formation of carbonyl and removal of the complex, as one may with acetaldehyde or formaldehyde and sodium bisulfite, or by a volatilization of the carbonyl and yet not the water, as one indeed may when acetone is formed as the byproduct of the hydrolytic splitting, and so forth. Alternately one may practice the instant process by only slowly charging the water either incrementally or continuously and removing the carbonyl formed immediately upon its formation thus driving reaction 1 to completion. Further, one may charge water in such small quantities that all will react completely due to the many gem dithioether linkages present by virtue of the Law of Mass Action. One may also charge more than a stoichiometric amount of water reactant to effect a complete hydrolytic split of all gem dithioether linkages in the high molecular weight polymer reactant, and then at some desired viscosity of liquid polymer product or at any desired mercaptan content of the product stop the splitting process by neutralizing the acid catalyst. At any event, regardless of the specific mode and exact technique that may be chosen to practice the instant process, it thus provides a controllable means by which one may theoretically specify beforehand and, in practice, provide curable polymercaptan polymers of any prescribed and desired average molecular weight, of any desired and prescribable molecular backbone configuration and of any desired and prescribable chemical and physical properties.

The polymercaptans of this invention are curable, that is to say they may be consecutively chain extended or conjoined to form molecules of increased molecular weight. For example, they may be oxidatively cured, to form larger molecules conjoined by disulfide linkages, and to form water as the byproduct such as is pictured in Equation 5.

(5)

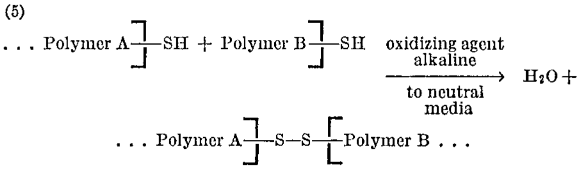

Exemplary oxidizing curing agents which may be used are listed in Table II.

TABLE II.—OXIDIZING CURING AGENTS

| Inorganic oxides | | Inorganic peroxides | | Inorganic oxidizing agents | |
|---|---|---|---|---|---|
| ZnO | FEO | $ZnO_2$ | $FeO_2$ | $Na_2CrO_4$ | $NaClO_4$ |
| PBO | $Fe_2O_3$ | $PbO_2$ | $As_2O_3$ | $K_2CrO_4$ | $KClO_4$ |
| MgO | CoO | $MgO_2$ | $Sb_2O_3$ | $Na_2Cr_2O_7$ | $Ba(ClO_4)_2$ |
| CaO | CuO | $CaO_2$ | $Sb_2O_5$ | $K_2Cr_2O_7$ | $Na_2B_4O_7$ |
| BaO | | $MnO_2$ | $SnO_2$ | $(NH_4)_2Cr_2O_7$ | $NH_4NO_3$ |
| | | $TeO_2$ | $Pb_3O_4$ | | |
| | | $SeO_2$ | | | |

| Organic peroxides | Organic oxidizing agents |
|---|---|
| Benzoyl peroxide. | Nitrobenzene. |
| Dicumyl peroxide. | Dinitrobenzene. |
| Cumene hydroperoxide. | Trinitrobenzene. |
| t-Butyl hydroperoxide. | Trinitrotoluene. |
| t-Butyl perbenzoate. | Other nitro compounds. |
| | p-Quinone dioxime. |
| | Other oximes. |

Alternately, they may be cured by condensation reactions with polyisocyanates to form polythiourethane linked polymers of higher molecular weight, or with polyepoxides to form polythioether linked polymers with pendant hydroxyl groups and higher molecular weight, such as is pictured in Equations 6 and 7 respectively.

(6)

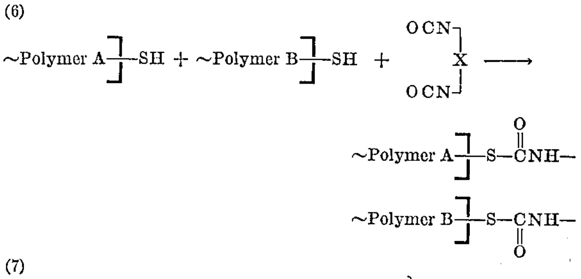

(7)

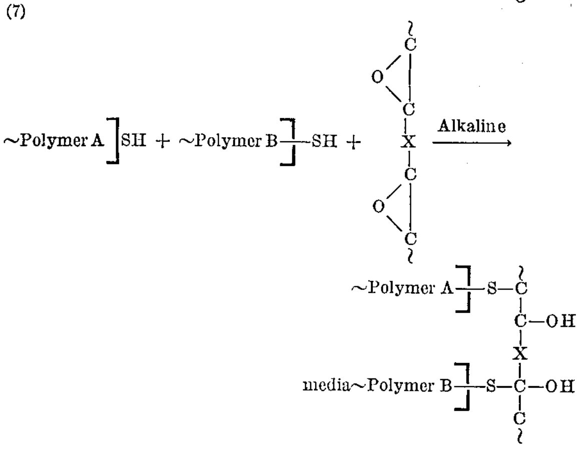

Therein X is a divalent intervening group defined as is R above.

The polyepoxide curing agents which also may be used to cure the instant polymercaptan polymers are those materials which have an average oxirane functionality of approximately two or more, that is, they are materials which contain an average of at least approximately two epoxide groups per molecule of the polyepoxide material. The position of the epoxide groups in the polyepoxide curing agent is not critical. For instance, if the polyepoxy material is essentially linear in structure the epoxide groups may be in a terminal position or they may be positioned intermediately and/or randomly along the linear structure. Polyepoxide materials which may be used as curing agents herein include the following types of materials.

(1) Essentially linear type such as

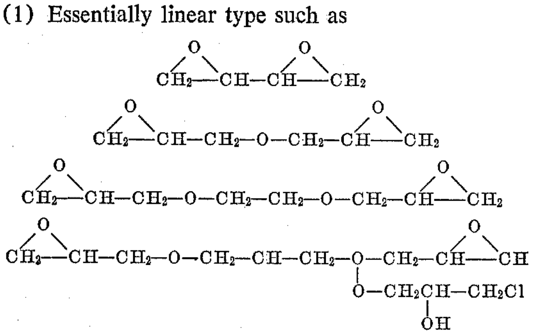

and the epoxidized polybutadiene materials such as those which have an epoxide functionality of four or more and are sold commercially under the designation "Oxiron" resins, i.e., "Oxiron 2001" and "Oxiron 2002."

(2) Bisphenol A/epichlorohydrin reaction products which are aromatic in nature and which include those sold commercially under the trademark designations "Tipox," i.e., "Tipox A," "Tipox B" and "Tipox C" resins; "Epon," i.e., "Epon 828" resin; and "Bakelite," i.e., "Bakelite ERL" resin. (Bisphenol A, chemically, is p,p'-isopropylidenediphenol.)

(3) Cyclo-aliphatic type which includes those sold commercially under the designation "Unox" resins, i.e., "Unox 206" which is epoxy ethyl-3,4-epoxy cyclohexane and "Unox 201" which is 3,4-epoxy-6-methylcyclohexylmethyl-3,4-epoxy-6-methylcyclohexanecarboxylate.

(4) Resorcinol diglycidyl ether type which includes those sold commercially under the designation "Kopoxite" resins, i.e., "Kopoxite 159."

(5) Epoxy novalak type alkyl novalak resins which are phenolic/epoxy type systems and which include the resin sold commercially under the designation "Dow Epoxy Novalak 438" or "DEN 438–EK 85" which contains 85% resin by weight and 15% methyl ethyl ketone as a solvent therefor, and the resins sold commercially under the designation "KER" resins, i.e., "KER 357A" and "KER 955A."

(6) Epoxidized fatty acid resins including those which are sold commercially under the designation "Epoxol" such as "Epoxol 9–5."

The polymercaptan polymers of the present invention have unique utility in that they have indefinite storage life and they are oxidatively or otherwise curable to form useful solids, such as elastomers or plastics. Cure of the instant polymer disulfide linkages formation especially desirable from the point of providing the cured products with an enhanced resistance to dissolution and/or chemical attack.

In order to cure the present polymercaptan containing polymers, they are uniformly admixed with the curing agent in such relative quantities as will provide a suitable number of mercaptan equivalents of polymer, usually one, per equivalent of curing agent to effect cure; the latter is based usually upon its oxidizing ability that is to say the number of and oxidizing effectiveness of the oxidizing groups or the number of isocyanate or oxirane groups available per molecule of curing agent. Usually stoichiometric quantities of equivalents of mercaptan and curing agent will provide adequate cures. With some agents such as $PbO_2$ or polyepoxides curing may be carried out at common room temperatures or above, whereas with others, such as cumene hydroperoxide or $ZnO_2$ elevated temperatures are needed to promote cure. The cure products obtained are usually solid materials, that may be formed, according to the specific chemical nature of the specific reactants and their polymeric backbone, into chemically or abrasion resistant puttylike materials or castings, films, plastics, elastomers, sealants, threads, coatings and the like. Liquid cure products also may be formed which may be used as inert lubricants.

The following examples illustrate modes of practice of the present invention but are not intended to limit the scope thereof.

EXAMPLE 1

A. Preparation of a poly(gem dithioether) containing polyurethane reactant

About 2 mols (156 g.) of 2-mercaptoethanol and 1 mol (44 g.) of acetaldehyde were reacted for about 10 hours at 50° C. in the presence of 0.2 ml. of concentrated sulfuric acid catalyst to provide the dihydroxy diethylene (methyl gem dithioether). About 70 ml. of benzene was added. In etherification the water of reaction was then forcibly removed by azeotropic distillation, the pot contents were neutralized at room temperature with CaO, and volatiles were removed by distillation. The pot product upon cooling formed a wax-like solid polymer in 120 g. yield, or 73.2% of theoretical. The polymer obtained had a melting point of about 88° C., 40.9 wt. percent sulfur, 5.62 wt. percent hydroxyl, by analysis and a molecular weight of about 605, based on the hydroxyl content. A polyurethane rubber is formed from the poly[ethylene (methyl gem dithioether) (ether)] diol prepared as above by reaction with hexamethylene diisocyanate in such quantities as to provide a ratio of equivalents of isocyanate to equivalents of hydroxyl of 1/1 in an environment otherwise free of active hydrogen-containing materials, under dry nitrogen gas, upon admixture at 120° C., for about 2 hours.

B. Preparation of a polymercaptan-polyurethane polymer of the invention

The poly(gem dithioether)-containing polyurethane rubber, prepared as in A above is abraded and cut to form a powdery material of small particle size. The mercaptan content of the reactant is obtained by analysis. Approximately 60 g. of the particulate rubber is suspended and dispersed in about 150 ml. of dry benzene in an enclosed reflux reaction vessel. To this is added 0.5 ml. of concentrated sulfuric acid. The temperature of the suspension is raised to about 80° C., the reflux temperature of benzene, and is maintained thereat. Water in 1 gram increments is charged thereto at intervals of about 0.5 hour each. This is continued until the mercaptan content of the pot product remains constant with incremental additions of water. At this point complete hydrolytic scission of all gem dithioether linkages to mercaptan terminals is achieved and all particles of rubber reactant have disappeared. Solvent and acetalydehyde produced as the byproduct are removed from the pot product mixture by volatilization at about 40° C. and at about 20 mm. of Hg. The dimercaptan product remaining is a liquid mixture of the ether dimercaptan $HS—C_2H_4—O—C_2H_4—SH$ of molecular weight 138 and the diurethane dimercaptan

of molecular weight 324 in the number proportions of about 4/1 to 5/1. This is determined by analysis. This also is easily calculated from the stoichiometry of the reactions in that each two polymeric wax molecules of about 605 molecular weight are conjoined by one hexamethylene diisocyanate molecule, and that each wax molecule by its mode of formation has a structure $$HOC_2H_4[SCHS—C_2H_4O—C_2H_4]_nSCHS—C_2H_4—OH$$

Each wax molecule therefore has about 4 to 5 equivalents of gem dithioether linkages, one of which, on the average, will constitute terminals for the diurethane dimercaptan, and the others for the ether dimercaptan when hydrolytic scission is complete.

In similar fashion to that used above to provide complete hydrolytic scission of the polyurethane poly(gem dithioether) polyether rubber to a mixture of substantially non-polymeric dimercaptans, partial hydrolytic splitting to form easily meltable polymeric polyurethane dimercaptans is here achieved by reaction of the rubber with a less than stoichiometric quantity of water required for complete scission.

An easily meltable mercaptan-containing poly[ethylene diurethane (gem dithioether) (ether)] polymer of this invention is prepared substantially according to the method as was described above for complete scission, using 0.01 mol or 0.18 g. of water with approximately 6 g. of powdered rubber, prepared as in A, until the mercaptan content is constant. Since there are between 4 to 5 equivalents of gem dithioether linkages per 600 molecular weight unit of the rubber reactant, as was determined by the mercaptan content obtained upon complete hydrolysis, one mol of water per 600 g. of rubber would split the rubber on the average into dimercapto-diurethane ether polymer molecules of about 600 molecular weight and containing approximately 3 to 4 unsplit gem dithioether linkages per molecule. An easily meltable polymer conforming to the structure

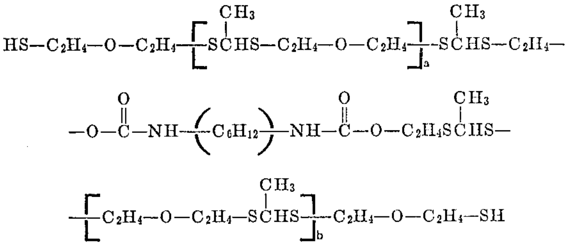

of approximately 600 to 700 molecular weight is obtained by this incomplete hydrolytic scission, wherein $a+b$ is from 1 to 2.

C. Cure of polymercaptan-polyurethane polymer of the invention (1) One hundredth mol, about 6 g., of the dimercaptan liquid polymer product formed as in B above is uniformly admixed with about 6 g. of a liquid polymeric diepoxide formed as the reaction product of epichlorohydrin and p,p'-isopropylidenediphenol having an epoxide equivalent of about 225 and a viscosity of about 300 poises at 25° C. To this is added 0.1 g. of the catalyst 2,4,6-tri(dimethylaminomethyl)phenol. The admixture is poured into a mold and permitted to stand at about 80° C. and within 10 hours a clear flexibilized plastic object is formed which has the configuration of the mold.

(2) One hundredth mol, 6 g., of the dimercaptan polymer product formed as in B above is uniformly admixed with 1 g. of tellurium dioxide, $TeO_2$. The admixture at 90° C. quickly solidifies to form an elastomeric polysulfide rubber product with properties suitable for use in cast printing roll applications.

(3) One hundredth mol, 6 g., of the dimercaptan polymer product formed as in B above is uniformly admixed with 2,4-toluene diisocyanate in such quantities so as to provide a ratio of equivalents of isocyanate to equivalents of mercaptan, NCO/SH, of 2/1 in an inert environment. A diisocyanate functional urethane prepolymer is obtained, which upon admixture with water in the presence of a base forms a plastic-like foam, and upon admixture with a dihydroxyl functional polyether glycol of about 2,000 molecular weight forms a urethane elastomer. When the dimercaptan is admixed with 2,4-toluene diisocyanate in a ratio NCO/SH of 1/1, a useful thiourethane elastomer is obtained.

EXAMPLE 2

A solid copolymer containing 400 molecular weight units of dimethyl polysiloxane,

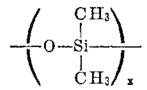

conjoined to diethylene gem dithioether groupings by hexamethylene diurethane bridges which substantially has the unit formula

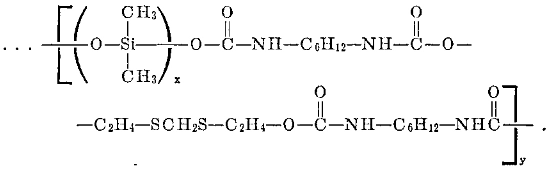

with one gem dithioether linkage per unit molecular weight, e.g. that which is between the formula brackets, of about 922, is hydrolytically split to a dimercaptan poly (polydimethyl siloxyl diethylene gem dithioether) liquid polymer of this invention having an average molecular weight of about 2,700 by admixture of a benzene suspension of about 92.2 g. of the powdered copolymer which contains about 0.1 g. equivalent of gem dithioether linkage, in 200 ml. of benzene with 0.6 g. or about 0.033 g. equivalent of water in an inert environment and in the presence of 0.03 g. equivalent of p-toluene sulfonic acid. The temperature is elevated to the reflux temperature of the solvent and maintained thereat with mixing of the reactants until the mercaptan content becomes constant with time.

The liquid dimercaptan product obtained is separated from the solvent and formaldehyde formed as the by-product by volatilization; the product has the structure

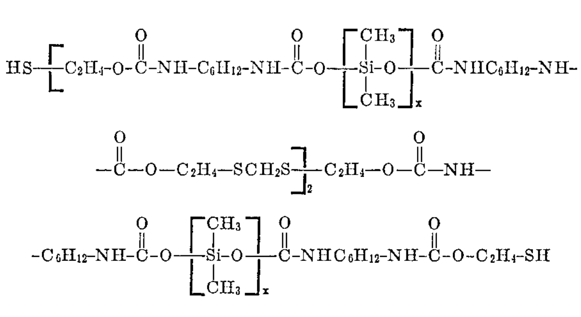

and has on the average a molecular weight of approximately 2,700. It is curable with oxidizing agents to provide disulfide linked elastomers, with polyepoxides to provide useful abrasion resistant flexible plastics and with polyisocyanates to provide foams, rubbers or plastics.

EXAMPLE 3

The liquid dimercaptan poly[poly(dimethyl siloxyl)diethylene (gem dithioether)] polymer of about 2,700 molecular weight and formed as in Example 2 is cured to a disulfide linked rubber with lead dioxide, $PbO_2$, at 80° F. in a period of about 24 hours. The rubber is then comminuted, and about 27 g. of the rubber powder is suspended in 100 ml. of the inert liquid dioxane, 1,4-diethylene dioxide. To this is charged about 0.3 ml. of pyrophosphoric acid. The temperature of the pot mixture is elevated to reflux, about 100–105° C.; about 0.18 g. of water is charged thereto. Reflux is maintained until the mercaptan content remains constant with time. The solvent and formaldehyde produced as a byproduct are separated from the liquid disulfide-containing polymer product. The polymer product also has a molecular weight of about 2,700, and has a structure which corresponds to

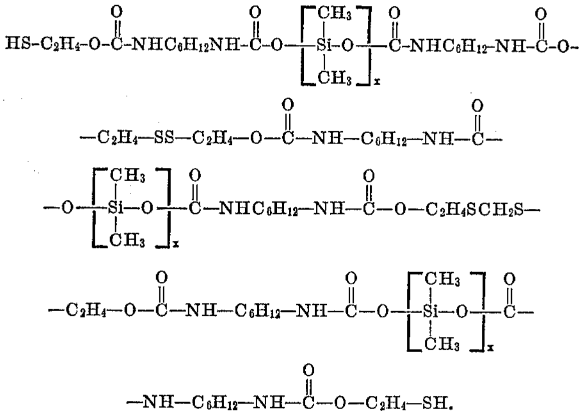

The foregoing liquid disulfide-containing polymer product is cured to a solid plastic by reaction in an alkaline medium of 1 mol with 1 mol of a liquid polyalkylene diepoxide of the formula

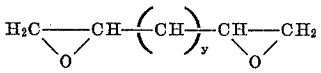

and having a molecular weight of 1,300. The plastic is comminuted and 40 g. of the powdered plastic is suspended in 100 ml. of toluene. To this is charged about 0.5 ml. of trichloroacetic acid. The temperature of the pot contents is raised to permit the toluene to reflux at about 110 to 115° C. About 0.18 g. of water is charged thereto, and heating is continued until the mercaptan content of the pot contents remains constant with heating time. The solvent and formaldehyde produced as the reaction byproduct are removed by volatilization at lower than atmospheric pressures and at about 50° C. The product obtained is a curable dimercaptan-containing liquid polymer, that on the average no longer contains any gem dithioether linkages, but does contain two pendant hydroxyl groups, two terminal mercaptan groups, three 400 molecular weight blocks of poly(dimethylsiloxyl) groups, six hexamethylene diurethane groups, one disulfide linkage, two thioether linkages, and one polymethylene group of about 1,300 molecular weight which contains at its ends the hydroxyl groups, all joined one to another with ethylene groups.

The foregoing dimercaptan polymer is cured by oxidizing agents to provide disulfide linked rubbers containing no gem dithioether groups, by polyepoxides to form hydroxyl-containing plastics containing thioether but no gem dithioether linkages, and by polyisocyanates to form thiourethane-containing foams, rubbers and plastics which contain no gem dithioether linkages.

The foregoing examples illustrate how by the method of this invention it is possible to sequentially hydrolyze a poly(gem dithioether) containing polymer, to lower molecular weight polymercaptan polymers then cure the polymercaptan polymeric product of hydrolysis in such a way as to join together blocks of polymeric units of diverse nature, e.g. join say a polysiloxane backbone, to a polyethylene backbone, or to a polyurethane backbone, all at will and to form prescribable products, by newly formed linkages that also are prescribable and may be thioether or thiourethane or disulfide in nature.

I claim:

1. A method for preparing a polymeric polymercaptan which comprises reacting, at a temperature above common room temperature a carbonyl polymeric reactant material of from 5,000 to over 1,000,000 molecular weight containing a plurality of gem dithioether linkages with water in the presence of a catalytically effective amount of a strong nonoxidizing acid to cleave hydrolytically the gem dithioether linkages, separating and recovering the resulting polymeric polymercaptan product of the hydrolytic scission therefrom.

2. A method as in claim 1 wherein said strong nonoxidizing acid has a $pK_a$ value of at most 2.5.

3. A method as in claim 2 wherein said acid is selected from the class consisting of sulfuric, hydrochloric, phosphoric, phosphorous, pyrophosphoric, dichloroacetic, glycerophosphoric, maleic, oxalic, trichloroacetic and p-toluene sulfonic acids.

4. A method as in claim 1 wherein said acid is present in quantities of from 0.005 to 5 acid equivalents per mol of water reactant present.

5. A method as in claim 1 wherein the ratio of the number of equivalents of gem dithioether linkages per unit weight of said polymeric material present to the number of mols of water reactant hydrolytically cleaving per unit weight of said polymeric material present is $\lesssim 1/1$.

6. A method as in claim 1 wherein the ratio of the number of equivalents of gem dithioether linkages per unit weight of said polymeric material to the number of mols of water reactant hydrolytically cleaving per unit weight of said polymeric material is $>1/1$.

7. A method as in claim 1 wherein said hydrolytically cleaving is conducted at a temperature in the range of about 50 to 250° C.

8. A method as in claim 1 wherein said polymeric reactant material additionally contains a plurality of linkages selected from the class consisting of thiourethane, urethane, ether, thioether, polysulfide and siloxyl linkages.

9. A method as in claim 1 wherein said polymeric polymercaptan product is a liquid.

10. A method as in claim 1 wherein said polymeric polymercaptan product is a solid.

11. A method as in claim 1 wherein said polymeric polymercaptan product contains a plurality of linkages selected from the class consisting of thiourethane, urethane, ether, thioether, gem dithioether, polysulfide and siloxyl linkages.

12. A method as in claim 1 wherein said hydrolytically cleaving is conducted in the presence of an inert organic solvent.

References Cited

UNITED STATES PATENTS

| | | | |
|---|---|---|---|
| 2,466,963 | 4/1949 | Patrick et al | 260—79.1 |
| 3,016,365 | 1/1962 | Holtschmidt | 260—79 |
| 3,314,913 | 4/1967 | Deutschman et al. | 260—79 |
| 3,317,461 | 5/1967 | Plueddemann | 260—79 |

DONALD E. CZAJA, *Primary Examiner.*

J. A. SEIDLECK, *Examiner.*

M. I. MARQUIS, *Assistant Examiner.*